No. 862,039. PATENTED JULY 30, 1907.
N. A. WESTERLUND.
SAD IRON HEATER.
APPLICATION FILED OCT. 23, 1906.

2 SHEETS—SHEET 1.

WITNESSES

INVENTOR
Nels A. Westerlund
BY
ATTORNEYS

No. 862,039.
PATENTED JULY 30, 1907.
N. A. WESTERLUND.
SAD IRON HEATER.
APPLICATION FILED OCT. 23, 1906.
2 SHEETS—SHEET 2.
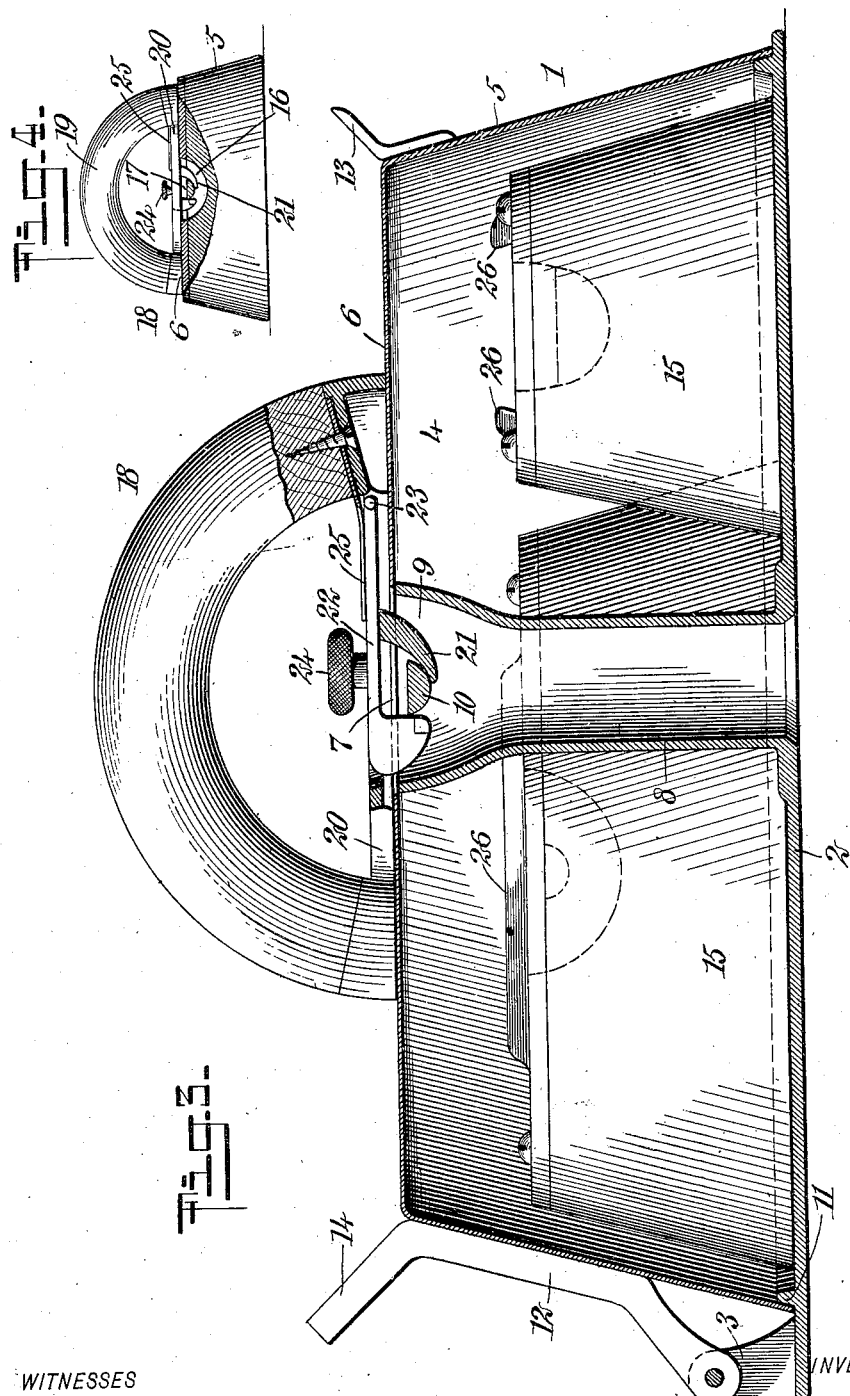
WITNESSES
INVENTOR
Nels A. Westerlund
BY
ATTORNEYS

UNITED STATES PATENT OFFICE.

NELS A. WESTERLUND, OF SUPERIOR, WISCONSIN.

SAD-IRON HEATER.

No. 862,039.  Specification of Letters Patent.  Patented July 30, 1907.

Application filed October 23, 1906. Serial No. 340,147.

*To all whom it may concern:*

Be it known that I, NELS A. WESTERLUND, a citizen of the United States, and a resident of Superior, in the county of Douglas and State of Wisconsin, have invented a new and Improved Sad-Iron Heater, of which the following is a full, clear, and exact description.

This invention relates to sad-iron heaters, and the object of the invention is to provide an arrangement whereby a number of sad-irons may be heated and moved conveniently from place to place.

More specifically, the invention contemplates an arrangement whereby the same handle may be used for moving the heater or for applying the sad-irons to the ironing board.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1:
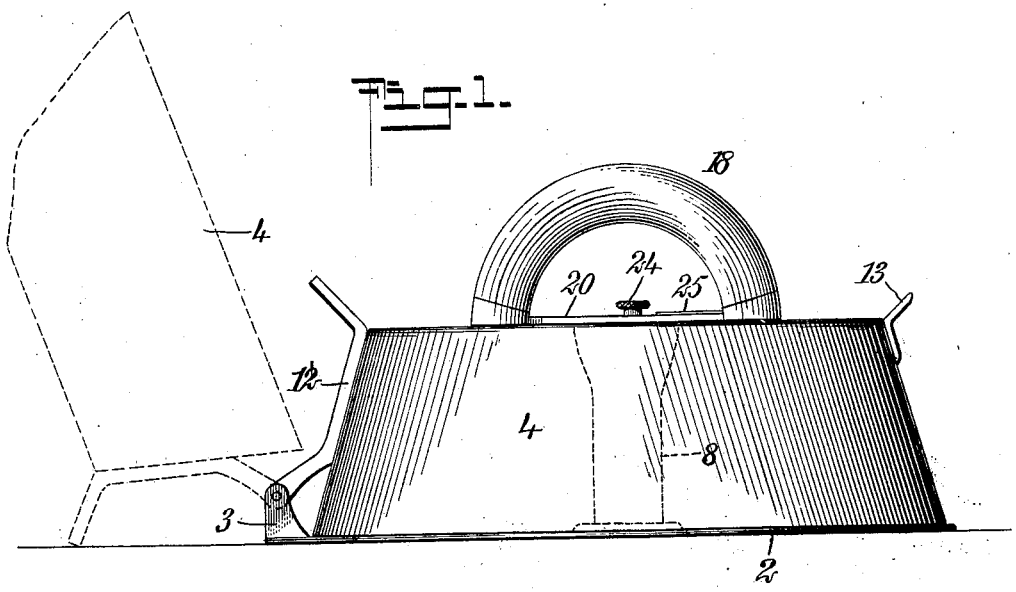
Figure 2:
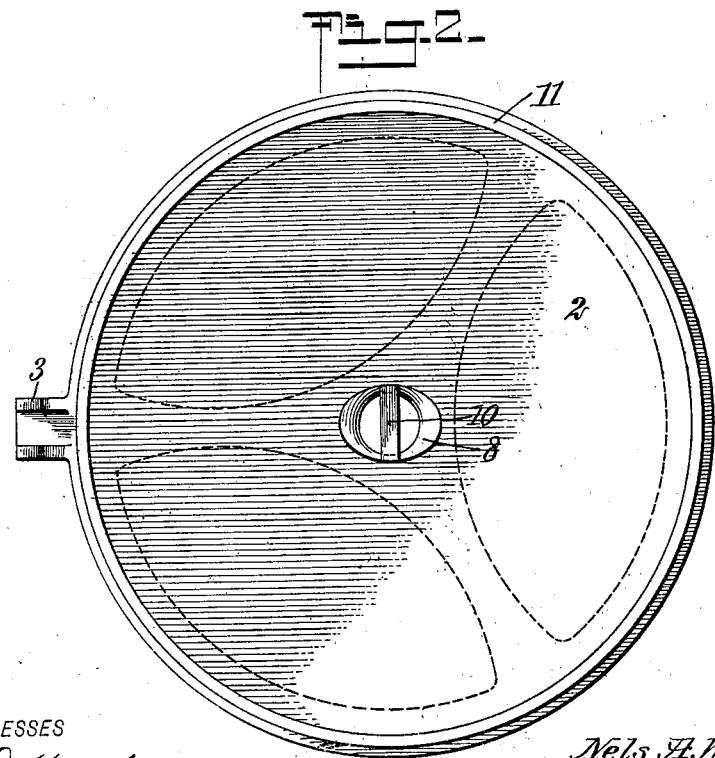

Figure 1 is a side elevation of the heater, the cover of the same being represented in dotted lines in an open position, a portion of the cover being represented as broken away; Fig. 2 is a plan of the base of the heater, the cover being represented as removed; in this view three sad-irons are represented in dotted outlines so as to indicate the manner in which they are placed within the heater; Fig. 3 is a vertical transverse section taken through the heater; this view illustrates the manner in which the handle is attached to the heater; and Fig. 4 is a side elevation of a sad-iron, a portion of which is broken away, and illustrating the manner in which the handle is attached to the sad-iron.

Referring more particularly to the parts, 1 represents the heater, which consists of a base or base plate 2, of substantially circular form, and which is provided at one side with lugs 3 to which the cover 4 of the heater is pivotally attached. The cover 4 has the form of the frustum of a cone, the conical side wall 5 of the heater being preferably formed integral with the top plate 6 thereof. This top plate 6 is of circular form, and provided centrally with an opening 7. This opening 7 is adapted to register over a centrally disposed post 8, which is integral with the base plate and extends upwardly therefrom vertically, as indicated in Fig. 3. This post is of tubular form, and its upper extremity is of slightly enlarged diameter, as indicated, to form a mouth 9. Across this mouth the post is formed with a transverse bar 10, the purpose of which will appear more fully hereinafter.

In order to make the cover fit nicely upon the base plate 2, near its periphery the base plate is provided with an upwardly projecting flange or bead 11 which extends circumferentially about the base plate, as indicated in Fig. 2. At one side, the cover 4 is provided with a hinge bar 12 which is rigidly attached thereto and pivotally attached to the lugs 3. Opposite this hinge bar the cover is provided with a clip 13, which facilitates the raising of the cover upon the hinge joint which is formed at the lugs 3, as will be readily understood. At its upper portion, the hinge bar 12 is provided with an inclined toe 14 which, when the cover is fully open, rests upon the surface which supports the heater in the manner indicated in the dotted lines in Fig. 1. In this way the cover is held open.

The heater is adapted to be set upon a stove and should be large enough to hold several sad-irons 15 which may be arranged around the central post 8 in the manner indicated in Fig. 2. The sad-irons illustrated are of a common form; these sad-irons have their handles detachably connected thereto in the usual manner. For this purpose, the upper face of each of the sad-irons is provided with a recess 16 in the manner illustrated in Fig. 4, which recess is formed with a transverse bar 17. The handle 18 is formed of a curved bar 19; the ends of the bar 19 are attached to a flat base bar 20, and this base bar has a curved toe 21, as indicated. This curved toe is adapted to slip under the cross bar 17. On the base bar 20 a catch 22 is mounted longitudinally, the same being mounted to swing upwardly upon a pivot 23, as illustrated in Fig. 3. On its outer side near the middle of the base bar the catch 22 is provided with a button or head 24 which is adapted to be seized so as to lift the catch upwardly. In applying the handle to the sad-iron, the catch 22 is held in an elevated position when the toe 21 is run under the cross bar, whereupon the catch is allowed to descend. In order to hold the catch down, the handle is provided with a leaf spring 25 attached in the manner illustrated in Fig. 3. In the cover the aforesaid opening 7 corresponds to the upper portion or mouth of the recess 16, so that the handle may be applied to the cover of the heater in the same manner as to one of the sad-irons. In this connection it should be understood that the bar 10 operates in the same manner as the bar 17, the toe 21 catching under the same in the manner illustrated in Fig. 3. The upper faces of the sad-irons are provided with longitudinally disposed ribs 26 which are slightly undercut on their inner faces so as to engage the side edges of the base bar 20 of the handle when applied thereto.

From the arrangement described, it will be clear that when the handle is applied to the cover in the manner shown in Fig. 3, the cover becomes securely locked to the base plate 2. With the handle attached to the heater, the heater may be moved about as desired upon the stove, or it may be removed to the ironing board. When the sad-irons within the heater are to be removed, the button 24 may be operated to release the catch, and a portion of the handle may then be applied to the clip 13 in order to raise the cover.

The handle will then be applied to any one of the sad-irons in the manner suggested above. The cover may be closed down when one of the sad-irons is in use, so that the heat of the other sad-irons will be retained.

Having thus described my invention, I claim as new and desire to secure by Letters Patent:

1. In combination, a heater having a base plate and a cover, a sad-iron within said heater, a detachable handle for said sad-iron, and means whereby said handle may lock said cover to said base plate.

2. In combination, a heater having a base plate and a cover movably attached thereto, said cover having an opening therethrough, said base plate presenting a member rigid therewith adjacent to said opening, a plurality of sad-irons adapted to be received in said heater, a detachable handle adapted to be attached to said sad-irons and having means for engaging said member through said opening whereby said handle may be attached to said cover.

3. In combination, a heater having a base plate with a post projecting upwardly therefrom, a cover for said base plate having an opening at said post, a plurality of sad-irons adapted to be received within said heater, a detachable handle adapted to be attached to said sad-irons, and means whereby said handle may engage said post to lock said cover to said base plate and to lock said handle to said cover.

4. In combination, a heater having a base plate, a cover hinged thereto and presenting an opening, said base plate having a post lying under said opening, said post presenting a cross bar in the upper portion thereof, a plurality of sad-irons adapted to be received within said heater and presenting recesses respectively in the upper faces thereof, with cross bars formed respectively in said recesses, and a detachable handle adapted to be attached to said sad-irons or said cover, and a catch on said handle adapted to engage the cross bars of said heater and said sad-irons.

In testimony whereof I have signed my name to this specification in the presence of two subscribing witnesses.

NELS A. WESTERLUND.

Witnesses:
GEO. K. FINNEY,
THOMAS GRAY.